(12) United States Patent
Kumar et al.

(10) Patent No.: US 11,532,036 B2
(45) Date of Patent: Dec. 20, 2022

(54) DIGITAL IMAGE ORDERING USING OBJECT POSITION AND AESTHETICS

(71) Applicant: Adobe Inc., San Jose, CA (US)

(72) Inventors: Vikas Kumar, New Delhi (IN); Sourabh Gupta, Noida (IN); Nandan Jha, Noida (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 449 days.

(21) Appl. No.: 16/673,599

(22) Filed: Nov. 4, 2019

(65) Prior Publication Data
US 2021/0133861 A1     May 6, 2021

(51) Int. Cl.
| | | |
|---|---|---|
| *G06Q 30/06* | (2012.01) |
| *G06K 9/62* | (2022.01) |
| *G06V 10/44* | (2022.01) |
| *G06V 10/20* | (2022.01) |
| *G06V 10/70* | (2022.01) |

(52) U.S. Cl.
CPC ....... *G06Q 30/0643* (2013.01); *G06K 9/6256* (2013.01); *G06K 9/6269* (2013.01); *G06V 10/255* (2022.01); *G06V 10/44* (2022.01); *G06V 10/70* (2022.01)

(58) Field of Classification Search
CPC .............. G06K 9/6256; G06K 9/6269; G06Q 30/0643; G06V 10/255; G06V 10/44; G06V 10/70
See application file for complete search history.

(56) References Cited

U.S. PATENT DOCUMENTS

2018/0137143 A1 * 5/2018 Brundage ........... G06F 16/5854

OTHER PUBLICATIONS

"38 Mind-Blowing Stats About User Generated Content", Retrieved at: https://www.tintup.com/blog/38-mind-blowing-stats-effectiveness-user-generated-content/, Sep. 13, 2016, 13 pages.
"Going Visual: Why You Need Images in Review Content", Retrieved at: https://www.powerreviews.com/blog/going-visual-why-you-need-images-in-review-content/, Jun. 12, 2019, 5 pages.

* cited by examiner

*Primary Examiner* — Ruiping Li
(74) *Attorney, Agent, or Firm* — FIG. 1 Patents

(57) ABSTRACT

Digital image ordering based on object position and aesthetics is leveraged in a digital medium environment. According to various implementations, an image analysis system is implemented to identify visual objects in digital images and determine aesthetics attributes of the digital images. The digital images can then be arranged in way that prioritizes digital images that include relevant visual objects and that exhibit optimum visual aesthetics.

20 Claims, 13 Drawing Sheets

DIGITAL IMAGE ORDERING USING OBJECT POSITION AND AESTHETICS

BACKGROUND

Image sharing systems enable digital images to be shared between different users in an online environment. For instance, users can upload digital images to a particular image sharing system, which can host the digital images for access by other users. Further, the image sharing system can organize digital images based on different topics, such as to enable users to share and view digital images that may be pertinent to a particular topic.

For instance, consider a scenario where an ecommerce platform that sells different products enables users to upload images of a product to a particular product webpage. A user that purchases the product, for example, can capture a digital image of the purchased product and upload the digital image to the product webpage. Generally, this enables other users to access the uploaded image and enable the users to learn more about the product, such as to make a more informed decision about purchasing the product. Typical ecommerce platforms, however, present uploaded digital images in chronological order based on date and time of upload, with most recently uploaded images presented first and subsequent images presented in reverse chronological order. Simply presenting digital images chronologically based on time of upload, however, often results in a number of poor quality digital images and/or digital images that are off-topic being prominently presented.

Accordingly, since conventional image sharing systems are unable to sort digital images based on image quality and topical relevance, this prevents such systems from presenting digital images to users in an order that prioritizes image quality and relevance. Thus, users are forced to manually sort through large groups of digital images to attempt to locate digital images that of sufficient quality and/or that are topically relevant. For large collections of images, this would require a user to manually sort through thousands and potentially millions of different digital images, which is practically infeasible. Further, this results in resource wastage across a digital media pipeline, from an image sharing system to an end user device. For instance, since a typical image sharing system simply receives and organizes uploaded images based on upload date and without regard to image quality or relevance, this causes the image sharing service to store many poor quality and/or off-topic digital images, which wastes data storage resources. Further, since users seeking access to digital images for a particular topic may be forced to repeatedly access a digital image repository of a typical image sharing system to locate images that are of sufficient quality and/or topically relevant, network bandwidth and processing bandwidth utilized to handle these repeated accesses is wasted, both at the image sharing system and the end user device.

Thus, conventional image sharing systems not only present a suboptimal user experience for accessing digital images, but also result in reduced device and network performance due to inefficient sorting and presentation of digital images.

SUMMARY

Digital image ordering based on object position and aesthetics is leveraged in a digital medium environment. According to various implementations, an image analysis system is implemented to identify visual objects in digital images and determine aesthetics attributes of the digital images. The digital images can then be arranged in way that prioritizes digital images that include relevant visual objects and that exhibit optimum visual aesthetics. For instance, for each digital image in a group, machine learning is leveraged to extract visual features from a digital image and to identify a visual object represented in the visual features. A position of the visual object relative to the digital image as a whole is characterized, such as based on whether a visual object of interest is detected in the digital image and if so, where the visual object is positioned within the image.

An aesthetics score for the digital image is then calculated based on a defined set of aesthetics criteria. An aesthetics machine learning model, for instance, is leveraged that processes visual attributes of the digital image based on trained aesthetic attributes, and generates an aesthetics score that characterizes correspondence of the digital image with the defined set of aesthetics criteria. Based on the visual object positions and aesthetics scores for each digital image, a set of digital images are sorted into different groups that each share common attributes. For instance, digital images with visually prominent visual objects and high aesthetics scores can be sorted into a group of primary images that are prioritized for presentation. Other digital images with small, truncated, or missing visual objects, and/or low aesthetics scores, can be sorted into other groups that are ranked below the primary images for presentation. In at least one implementation, the different groups of digital images can be processed to identify visually similar images and remove duplicate images, which conserves resources that would otherwise be utilized to store and present digital images that are substantially similar.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
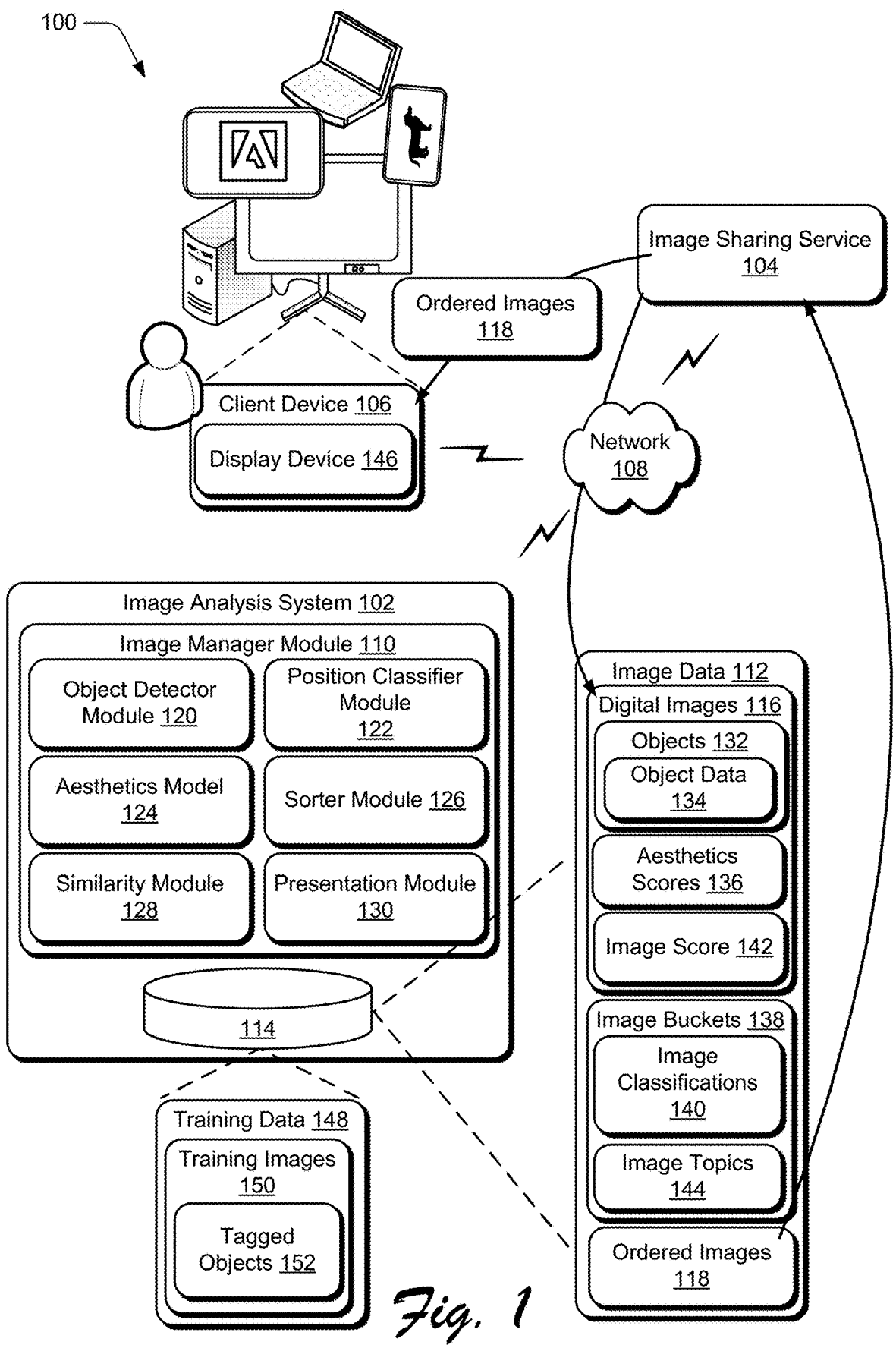
FIG. 1 is an illustration of an environment in an example implementation that is operable to employ techniques described herein.

To overcome the challenges to arranging and presenting digital images experienced in typical image sharing systems, digital image ordering based on object position and aesthetics is leveraged in a digital medium environment. For instance, to mitigate the problem of simply presenting images in chronological order without consideration of image quality or topical relevance, an image analysis system is implemented to identify visual objects in digital images and determine aesthetics attributes of the digital images. The digital images can then be arranged in way that prioritizes digital images that include relevant visual objects and that exhibit optimum visual aesthetics.

Consider, for instance, a conventional image sharing service that enables users to upload and share digital images with one another, such as digital images pertaining to a particular topic. Typically, the conventional image sharing service would simply arrange digital images chronologically based on upload date. However, this may result in many poor quality images and/or off topic images being hosted and presented to users, which wastes resources both from the service and the end user perspectives.

Accordingly, techniques for digital image ordering based on object position and aesthetics processes a set of digital images to be shared to characterize visual objects included in the images, and to determine visual aesthetics of the images. Generally, this enables those digital images with relevant visual objects and high aesthetic appeal to be presented for access, which reduces resource load across an image sharing pipeline. To implement the disclosed techniques, for each digital image in a group, machine learning is leveraged to extract visual features from the digital image and to identify a visual object represented in the visual features. A position of the visual object relative to the digital image as a whole is characterized, such as based on whether a visual object of interest is detected in the digital image and if so, where the visual object is positioned within the image. In at least some implementations, digital images with a visual object near the center of the images are preferred.

An aesthetics score for the digital image is then calculated based on a defined set of aesthetics criteria. An aesthetics machine learning model, for instance, is leveraged that processes visual attributes of the digital image based on trained aesthetic attributes, and generates an aesthetics score that characterizes correspondence of the digital image with the defined set of aesthetics criteria. Example of different aesthetics criteria are described below, and generally relate to color composition, image composition, and so forth.

Based on the visual object positions and aesthetics scores for each digital image, a set of digital images are sorted into different groups that each share common attributes. For instance, digital images that with visually prominent visual objects and high aesthetics scores can be sorted into a group of primary images that are prioritized for presentation. Other digital images with small, truncated, or missing visual objects, and/or low aesthetics scores, can be sorted into other groups that are ranked below the primary images for presentation. In at least one implementation, the different groups of digital images can be processed to identify visually similar images and remove duplicate images, which conserves resources that would otherwise be utilized to store and present digital images that are substantially similar.

Accordingly, when digital images pertaining to a particular topic are to be presented, the primary images with the visual object pertaining to the topic are selected for initial presentation. A user, for instance, interacts with an image sharing service obtain information about the topic, and the primary images are presented for user access.

The described techniques thus remedy inefficiencies and resource wastage experienced in typical image sharing systems. For example, by sorting digital images to prioritize images with topical relevance (e.g., relevant visual objects) and high aesthetics values, system resources such as data storage, memory, processor bandwidth, and network bandwidth used to store, process, and communicate digital images are conserved. Such resources are conserved, for example, since they are not utilized for processing and serving less relevant or less useful digital images. Further, user device resources are conserved since a user is initially presented with relevant and high quality digital images. Thus, a user isn't forced to engage in repeated image requests to locate useful digital images, which can unnecessarily burden device resources such as processor bandwidth and network bandwidth utilized to process and communicate such requests.

TERM DESCRIPTIONS

These term descriptions are provided for purposes of example only and are not intended to be construed as limiting on the scope of the claims.

As used herein, the term "digital image" refers to data representations of visual images that are captured and/or converted into digital form, such as digital photographs, digitized versions of physical images, images generated via a digital image editing application, digital videos, animations, and so forth.

As used herein, the term "visual feature" refers to visual elements of digital images, such as visual structures that make up a digital image. Generally, a particular digital image can be characterized as a set of visual features that are arranged in a particular way to generate the visual appearance of the particular digital image. Examples of visual features include lines, shapes, edges, colors, and combinations thereof.

As used herein, the term "visual object" refers to a visual feature and/or collection of visual features that combine to form an integrated visual entity that is recognizable by a machine and/or a human as an object with a distinct identity. A particular digital image, for example, may include a single visual object and/or multiple visual objects that are the focus of the digital image. Examples of visual objects include a human, a consumer product, a product of nature (e.g., a tree, an animal, and so forth), a geological feature, an architectural structure, and so on.

As used herein, a "position" of a visual object in a digital image refers to where the visual object occurs visually in reference to the digital image as a whole. For instance, a digital image can be characterized as a group of pixels that each have a particular pixel coordinate, e.g., x and y values. Accordingly, a position of a visual object in the digital image can be characterized with reference to where pixels that make up the visual object occur in the group of pixels, such as with reference to the x and y coordinates of the visual object's pixels. A position of a visual object in a digital image may additionally or alternatively be specified in other ways, such as in terms of distance of the visual object (and/or a bounding box of the visual object) from a perimeter of the digital image, with reference to distinct region of the digital image where the visual object is positioned (e.g., center, top left, lower right, and so forth), and so on.

As used herein, the terms "aesthetics score" and/or "aesthetics" refers to ways for quantitatively evaluating visual aesthetics of digital images. For instance, different predefined aesthetics criteria can be utilized to analyze visual attributes of a digital image, such as image quality (e.g., sharpness, noise, contrast, color accuracy, distortion, and so forth), color harmony, depth of field, motion blur, and so on. In at least one implementation, an aesthetics machine learning model is trained to evaluate different aesthetics criteria of a digital image, and to generate an aesthetics score that quantifies a relative correspondence of the digital image with the aesthetics criteria.

As used herein, the term "ordered group of digital images" refers to a set of digital images that are sorted and/or arranged in a particular order based on various criteria, such as visual object position and/or aesthetics scores. For instance, digital images from a set of digital images can each be characterized (e.g., scored) based on their respective object positions and aesthetics scores, and each digital images can then be placed into an ordered set of digital images based on its respective object position and aesthetics score. As detailed below, certain object positions are designated as preferable, such as centered within a digital image.

As used herein, the term "bitmap mask" references to a visual bitmap generated to represent the shape of a visual object. For instance, pixels of a visual object are overlaid with black pixels to generate a bitmap mask that describes a general shape of the visual object. Generally, a bitmap mask may be used for various purposes, such as object identification and object position determination.

In the following discussion, an example environment is first described that may employ the techniques described herein. Example systems and procedures are then described which may be performed in the example environment as well as other environments. Performance of the example procedures is not limited to the example environment and the example environment is not limited to performance of the example procedures. Finally, an example system and device are described that are representative of one or more computing systems and/or devices that may implement the various techniques described herein.

Example Environment

FIG. 1 is an illustration of an environment 100 in an example implementation that is operable to employ digital image ordering based on object position and aesthetics as described herein. The illustrated environment 100 includes an image analysis system 102, an image sharing service 104, and a client device 106 that are communicatively coupled, one to another, via a network 108.

Computing devices that are usable to implement the image analysis system 102, the image sharing service 104, and the client device 106 may be configured in a variety of ways. A computing device, for instance, may be configured as a desktop computer, a laptop computer, a mobile device (e.g., assuming a handheld configuration such as a tablet or mobile phone), and so forth. Additionally or alternatively, a computing device may be representative of a plurality of different devices, such as multiple servers utilized by a business to perform operations "over the cloud" as further described in relation to FIG. 13.

The image analysis system 102 is representative of functionality to perform various types of analyses on digital images, such as those utilized for techniques for digital image ordering based on object position and aesthetics. To assist in implementing these techniques, the image analysis system 102 maintains an image manager module 110, as well as image data 112 stored on a storage 114. Further, the image data 112 includes digital images 116 which the image manager module 110 can process to generated ordered images 118.

To enable the image manager module 110 to process the digital images 116, the image manager module 110 leverages various functionality including an object detector module 120, a position classifier module 122, an aesthetics module 124, a sorter module 126, a similarity module 128, and a presentation module 130. A brief discussion of each of these modules in presented in this section, with more detailed discussion provided in subsequent sections.

The object detector module 120 is representative of functionality to process digital images 116 and to recognize objects 132 (or lack thereof) in the digital images. For instance, for an individual digital image 116, the object detector module 120 can perform feature extraction to extract visual features present in the digital image. Based on the extracted visual features, the object detector module 120 can recognize and classify an object 132 detected in the digital image, and can generate confidence score indicating a likelihood that the recognized object 132 corresponds to a classification applied to the object. The object detector module 120 further determines a position of individual objects 132 relative to their respective digital images 116. Accordingly, the object detector module 120 generates object data 134 that describes various attributes of the objects, such as object classification, object position, object confidence scores, and so forth. Further details concerning operation of the object detector module 120 are provided below.

The position classifier module 122 is representative of functionality to process the object data 134 for objects 132 recognized in digital images 116 by the object detector module 120, and to classify the positions of the objects relative to their respective digital images 116. For instance, for a particular object 132 identified by the object detector module 120 in a digital image 116, the position classifier module 122 utilizes the object data 134 for the object 132 to classify the position of the object relative to a perimeter (e.g., borders) of the digital image 116. The position classifier module 122 can then augment the object data 134 to provide a position classification that describes the position of the object 132 relative to the digital image 116 as a whole. In at least some implementations, the object data 134 categorizes each object 132 into different discrete position classifications.

The aesthetics module 124 is representative of functionality to process digital images 116 and to generate aesthetics scores 136 that characterize visual aesthetics of the digital images 116. Generally, as discussed herein "visual aesthetics" refers to ways for digitally characterizing different visual attributes of digital images 116 that affect human visual perception of the digital images. Visual aesthetics, for example, can be based on different visual factors, such as image quality (e.g., sharpness, noise, contrast, color accuracy, distortion, and so forth), color harmony, depth of field, motion blur, and so on. Thus, the aesthetics module 124 can process a digital image 116 based on different aesthetics factors to generate an overall aesthetics score 136 for the digital image.

The sorter module 126 is representative of functionality to sort the digital images 116 into different image buckets 138 (e.g., image groups) based on characterizations of the digital images provided by the position classifier module 122 and the aesthetics module 124. For instance, the sorter module 126 utilizes position data and aesthetics score for each digital image 116 to place the digital image into an image bucket 138 based on correlating position data and the aesthetics score with an image classification 140 for the image bucket 138. The position data and aesthetics score from the object data 134, for instance, are utilized to generate an image score 142 for each digital image 116. Thus, digital images 116 with similar image scores 142 can be grouped together in a particular image bucket 138.

Further, different image buckets 138 can be associated with different image topics 144, such as based on objects 132 identified in digital images 116 placed in the image buckets 138. The image topics 144, for instance, correspond to object classifications generated by the object detector module 120 for the objects 132.

The similarity module 128 is representative of functionality to process and identify digital images 116 in the image buckets 138 that are similar, and to filter out similar digital images. For instance, for a particular image bucket 138, the similarity module 128 compares image features in the individual digital images 116 within the image bucket 138 to ascertain whether any of the digital images 116 have similar image features. When two digital images 116 are identified that have similar image features, the similarity module 128 can remove one of the digital images such that the other digital image remains in the image bucket 138. In at least one implementation, a similar digital image 116 with a lower aesthetics score 136 is selected for removal from the image bucket 138.

The presentation module 130 is representative of functionality to process the image buckets 138 to generate the ordered images 118. For instance, after the similarity module 128 has pruned similar images from the image buckets 138, the presentation module 130 utilizes remaining digital images 116 from the image buckets 138 to generate the ordered images 118. Generally, the ordered images 118 represent a set of digital images 116 that are ordered based on their occurrence in the image buckets 138. The ordered images 118, for instance, prioritize digital images 116 within each image bucket 138 with the highest aesthetics scores 136. The ordered images 118 in each image bucket 138, for instance, are arranged in descending order based on their respective aesthetics scores 136 from highest to lowest.

In at least some implementations, the image analysis system 102 processes the digital images 116 on behalf of the image sharing service 104. For instance, the image analysis system 102 obtains the digital images 116 from the image sharing service 104 and generates the ordered images 118 as described herein. The ordered images 118 can then be made available to the image sharing service 104, which can host the ordered images 118 for user access. For instance, a user of the client device 106 can interact with the image sharing service 104 to cause the ordered images 118 to be displayed on a display device 146 of the client device 106.

As part of processing the digital images 116 to generate the image buckets 138 and the ordered images 118, the image manager module 110 utilizes various machine learning techniques to implement certain of the described modules. Accordingly, to enable the image manager module 110 to implement machine learning techniques, the image analysis system 102 maintains training data 148 stored on the storage 114. Generally, the training data 148 can be utilized by the image manager module 110 to train different machine learning models utilized by the image manager module 110 prior to processing the digital images 116. The training data 148, for instance, includes training digital images ("training images") 150, which include tagged objects 152. The tagged objects 152, for instance, are generated by processing (e.g., manually) the training images 150 and applying tags to the tagged objects 152 that identify which category each tagged object 132 belongs to. The training images 150 and the tagged objects 152 can then be used to train different machine learning models utilized by the image manager module 110, examples of which are described below.

Having considered an example environment, consider now a discussion of some example details of the techniques for digital image ordering based on object position and aesthetics in a digital medium environment in accordance with one or more implementations.

Implementation Scenarios

Figure 2:
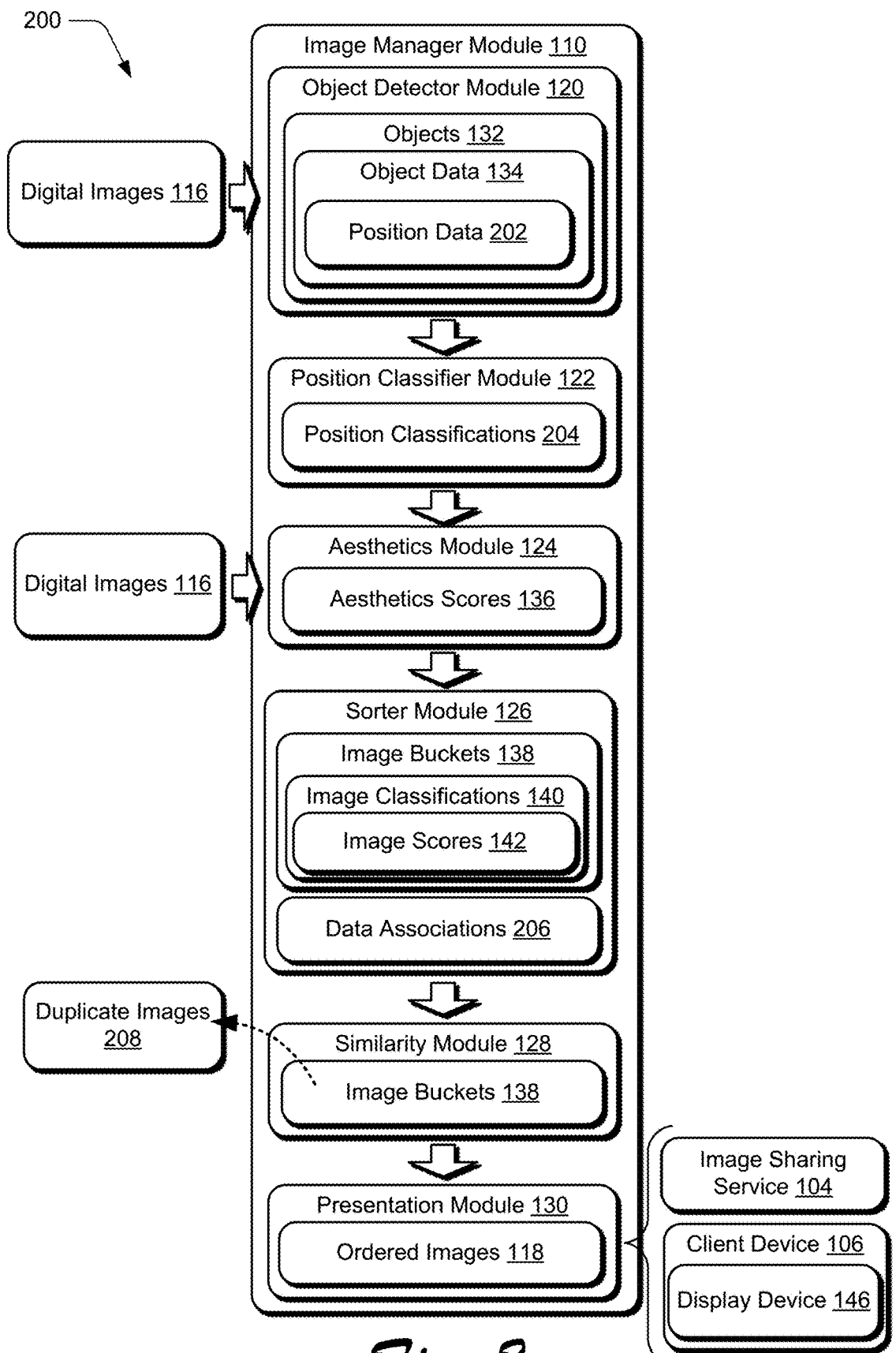
FIG. 2 depicts an example system that represents an overview of processes for digital image ordering based on object position and aesthetics.

FIG. 2 depicts an example system 200 that represents an overview of processes for digital image ordering based on object position and aesthetics in accordance with various implementations. More detailed discussions of individual aspects of the system 200 are presented after discussion of the system 200. In the system 200, the image manager module 110 receives digital images 116, such as from the image sharing service 104. The object detector module 120 processes the digital images 116 to identify objects 132 in the digital images 116. In conjunction with identifying the objects 132, the object detector module 120 generates object data 134 that describes various attributes of the identified objects 132, including position data 202. Further details concerning operation of the object detector module 120 and the object data 134 are discussed below with reference to FIG. 2.

The position classifier module 122 takes the object data 134 as input, and utilizes the position data 202 to generate position classifications 204 for the objects 132. Generally, the position classifications 204 characterize the positions of the objects 132 relative to their respective digital images 116. As further detailed below, for instance, the position classifications 204 describe a position of an object 132 relative to a perimeter of a respective digital image 116, such as whether an object 132 is centered, close to an image border, truncated, smaller than a threshold size, and so forth.

The aesthetics module 124 takes the digital images 116 as input, and generates aesthetics scores 136 for individual digital images 116. As mentioned above, the aesthetics scores 136 are based on quantifying different visual attributes of the digital images 116. For instance, different aesthetics rules are generated and used by the aesthetics module 124 to process the digital images 116 to generate the aesthetics scores 136.

Further to the system 200, the sorter module 126 utilizes the object data 134 (including the position classifications 204) and the aesthetics scores 136 to place the digital images 116 into different image buckets 138, and to organize the digital images 116 within each image bucket 138. Each image bucket 138, for instance, is based on a different respective image classification 140 that corresponds to a relative position of objects 132 to respective digital images 116 in each image bucket 138, and aesthetics scores 136 for digital images 116 within each image bucket 138. The image classifications 140, for example, are based on different image scores 142. The sorter module 126 also generates data associations 206 for each digital image 116, which associate the different image attributes described above with each digital image 116. In at least one implementation, the data associations 206 represent metadata for each digital image 116 that includes various image attributes, such as position data 202, position classification 204, aesthetics score 136, image classification 140, and so forth.

The similarity module 128 then processes each image bucket 138 to identify and remove duplicate images 208 from each image bucket 138. The similarity module 128, for instance, compares visual features of digital images 116 within individual image buckets 138. When multiple similar images are identified, one particular similar image can be retained in the image bucket 138, and other duplicate images 208 can be discarded. In at least one implementation, the similar digital image that is retained represents a digital image with a highest aesthetics score 136 from among a set of identified similar images.

Continuing, the presentation module 130 processes the image buckets 138 (e.g., with the duplicate images 208 removed) to generate the ordered images 118. The presentation module 130, for example, generates the ordered images 118 by arranging digital images 116 in each image bucket 138 starting with a digital image 116 with a highest aesthetics score 136 and then in order of decreasing aesthetics score 136. The presentation module 130 can then cause the ordered images 118 to be available to other entities, such as the image sharing service 104 and the client device 106.

Figure 3:
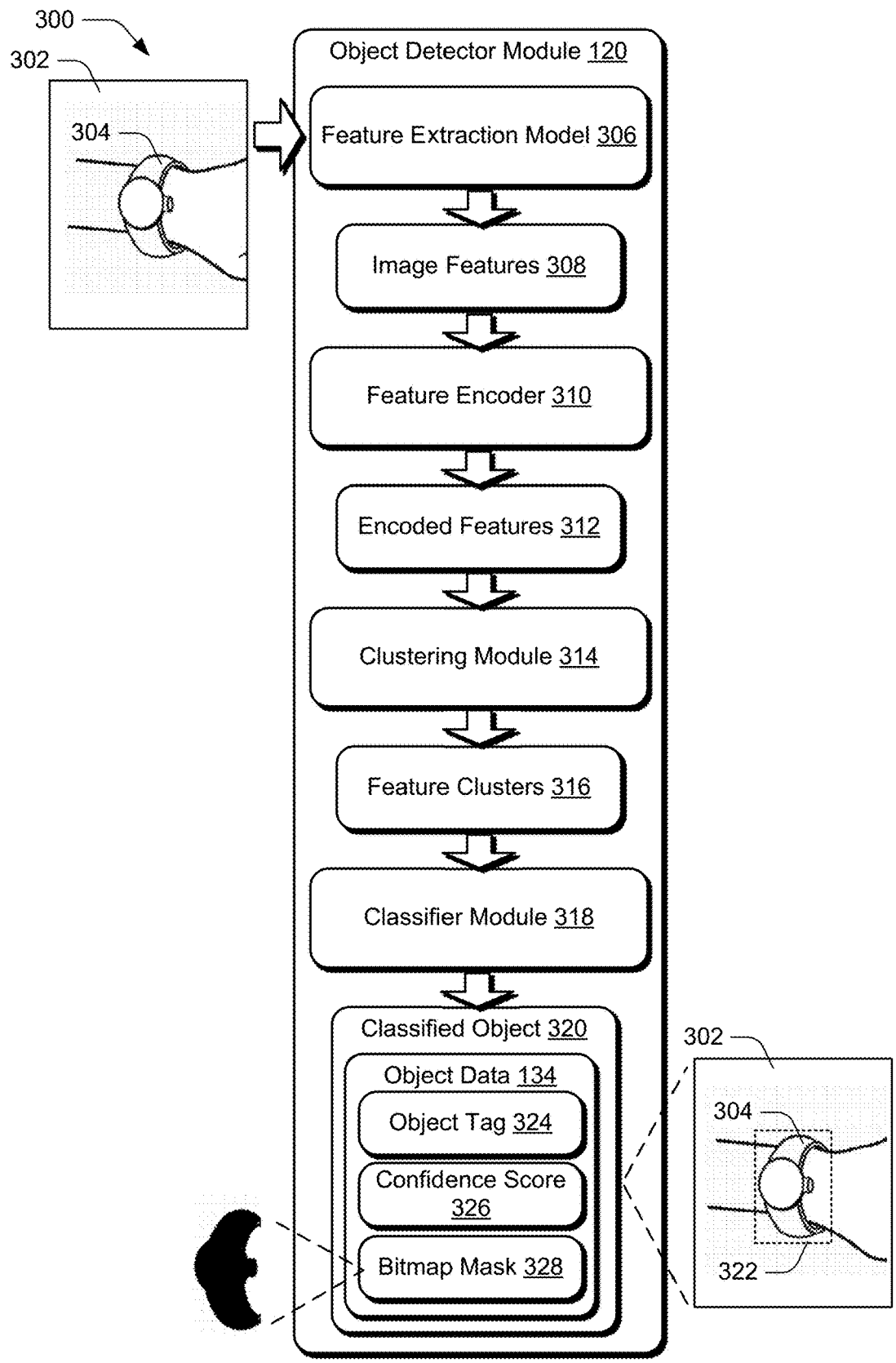
FIG. 3 depicts a system illustrating example operation of an object detector module.

FIGS. 3-10 now depict detailed operations of different entities described with reference to the environment 100 and the system 200. FIG. 3 depicts a system 300 illustrating example operation of the object detector module 120. In the system 300, the object detector module 120 takes a digital image 302, which includes an object 304, as input. Generally, the digital image 302 and the object 304 represent instances of the digital images 116 and the objects 132, respectively. In this particular example, the object 304 represents a wristwatch. The object detector module 120 leverages a feature extraction model 306 to extract image features 308 from the digital image 302. In at least one implementation, the feature extraction model 306 represents a convolutional neural network (CNN) that takes the digital image 302 as input and generates different image features 308 that represent object proposals for different visual features included in the digital image 302. A feature encoder 310 then encodes the image features 308 to generate encoded features 312. Generally, the encoded features 312 represent reduced data size representations of the image features 308, such as generated via data compression.

A clustering module 314 takes the encoded features 312 and generates feature clusters 316 that each represent encoded features 312 that are similar. For instance, the clustering module 314 utilizes a k-nearest nearest neighbor algorithm to cluster the encoded features 312 and to thus generate the feature clusters 316. A classifier module 318 processes the feature clusters 316 to specify identify objects represented by the feature clusters 316, which in this example includes the object 304. Thus, the classifier module 318 labels the object 304 as a classified object 320.

As part of identifying the classified object 320 from the digital image 302, the object detector module 120 outputs the object data 134 that includes various attributes of the classified object 320. The object data 134, for instance, identifies a bounding box 322 that represents a location of the object 304 relative to the digital image 302. For example, the object data 134 specifies a location and size of the bounding box 322 relative to the digital image 302 as a whole, such as using image coordinates (e.g., pixel coordinates, x/y coordinates, and so forth) that specify a perimeter of the bounding box 322 relative to a perimeter of the digital image 302.

The object data 134 further includes an object tag 324, a confidence score 326, and a bitmap mask 328 for the classified object 320. Generally, the object tag 324 specifies an object type label for the classified object 320. The object detector module 120, for instance, compares the extracted and processed features of the object 304 to a set of known identified object features to classify the classified object 320. For example, the object tag 324 identifies the classified object 320 as a "wristwatch" and/or "watch." The confidence score 326 represents a value that quantifies a likelihood that the classified object 320 represents an instance of an object identified by the object tag 324. In at least one implementation, the confidence score 326 is generated using a floating point scale of 0→1 (with intervening values), with 0 indicating a low likelihood and 1 indicating a high likelihood that the classified object 320 represents an object instance identified by the object tag 324.

The bitmap mask 328 represents a pixel mask that is generated to represent the classified object 320, such as using black pixels that overlay the classified object 320. For instance, the bitmap mask 328 is a data representation of a visual outline of the classified object 320.

In at least some implementations, the object detector module 120 represents a machine learning model and the different described components represent different models and algorithms utilized to implement functionality of the object detector module 120. The object detector module 120, for example, represents a region proposal network (RPN) that processes the digital image 302, identifies potential regions where an object may be present in the digital image 302, and generates the classified object 320 as described. One example of a suitable machine learning model for implementing the object detector module 120 is the Faster region-based convolutional neural network (RCNN) model, such as the ResNet-101 model that is trained on over one million images to recognize and classify images and objects. However, according to implementations for digital image ordering based on object position and aesthetics, the object detector module 120 can be configured using any type of machine-learning technique to enable classification of objects in digital images as described herein. Further, such a machine-learning model uses one or more of supervised learning, unsupervised learning, or reinforcement learning. For example, the machine-learning model can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, or combinations thereof.

Figure 4:
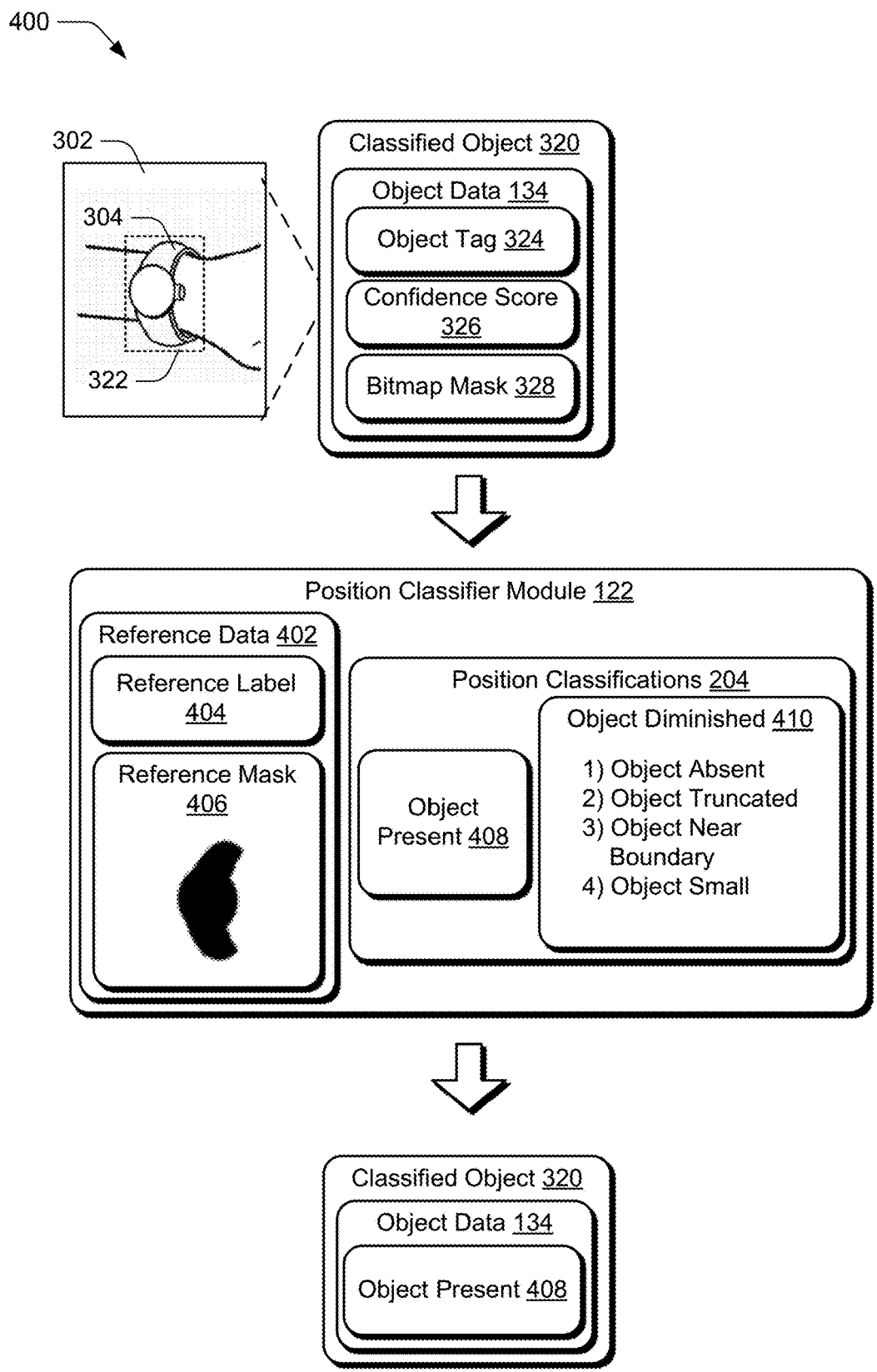
FIG. 4 depicts a system illustrating example operation of a position classifier module.

FIG. 4 depicts a system 400 illustrating example operation of the position classifier module 122. In the system 400, the position classifier module 122 takes the classified object 320 and the object data 134 as input and processes the classified object 320 to characterize a position of the object relative to the source digital image 302. In this particular example, the position classifier module 122 leverages reference object data ("reference data") 402, which represents known data about known reference objects, such as visual objects used to train the object detector module 120 for object recognition. For instance, consider that the digital image 302 was obtained from a group of digital images 116 associated with a particular image topic 144, such as "wristwatches." In this particular example, the reference data 402 represents known data about digital images including wristwatch objects. The reference data 402, for instance, includes a reference label 404 and a reference bitmap mask ("reference mask") 406. The reference label 404 includes different word labels (e.g., synonyms) that describe a wristwatch, e.g., "wristwatch," "watch," "timepiece," "smartwatch," and so forth. The reference mask 406 represents an average bitmap mask obtained through visual analysis of known instances of wristwatch image objects.

Accordingly, the position classifier module 122 compares the object data 134 to the reference data 402 to classify a position of the classified object 320 relative to the digital image 302. The position classifier module 122, for instance, compares the object tag 324 to the reference label 404 to determine if the object tag 324 corresponds to any word labels identified by the reference label 404. If the object tag 324 does not correspond to the reference label 404, the position classifier module 122 determines that an object associated with the reference data 402 is not present in the digital image 302.

In this particular example, the position classifier module 122 determines that the object tag 324 corresponds to the reference label 404, and thus performs further processing using the object data 134. For instance, the position classifier module 122 compares the bitmap mask 328 for the classified object 320 to the reference mask 406. Generally, this comparison indicates a relative portion of the classified object 320 that is present in the digital image 302, e.g., whether a complete view of the classified object 320 from a particular perspective is present in the digital image 302, or whether the classified object 320 is visually diminished in some way in the digital image 302. The position classifier module 122 can also utilize the bounding box 322 for the classified object 320 to characterize a position of the object.

Accordingly, the position classifier module 122 is configured to characterize the classified object 320 into the different position classifications 204, which in this example includes an object present classification 408 and object diminished classifications 410. The object present classification 408 indicates that the classified object 320 corresponds to an object identified in the reference data 402, and that the object data 134 indicates that a size and position of the classified object 320 relative to the digital image 302 meet specific size and position thresholds, which are further discussed below. In at least one implementation, the object present classification 408 is applied to objects that are within a threshold distance of a center of a respective digital image.

The object diminished classifications 410 represent object positions that are less than optimal, including:
1) Object Absent—an object tag for an object does not correspond to an object identified in the reference data 402 (e.g., by the reference label 404). An object identified in the reference data 402, for instance, is not detected in the digital image 302.
2) Object Truncated—an object detected in the digital image 302 corresponds to an object identified in the reference data 402, but the object is truncated. The object, for instance, is truncated by an outer edge of the digital image 302, and/or is truncated (e.g., visually obscured) by another object in the digital image 302. In at least one implementation, truncation can be determined by comparing the bitmap mask 328 for the classified object 320 to the reference mask 406. If a threshold area of the reference mask 406 is missing from the bitmap mask 328, this may indicate that the object is truncated.
3) Object Near Boundary—an object is determined to be within a threshold distance of a perimeter boundary of the digital image 302. In at least one implementation, the position classifier module 122 determines a distance between the bounding box 322 and a perimeter of the digital image 302. If the distance is within (e.g., less than or equal to) a threshold distance, the position classifier module 122 classifies the object as "Object Near Boundary."
4) Object Small—the size of an object is determined to be smaller than a threshold size relative to a total size of the digital image 302. In at least one implementation, the position classifier module 122 compares a size of the bounding box 322 (e.g., L×W of the bounding box 322) to a size of the digital image 302, e.g., L×W of the digital image 302. If the size of the bounding box 322 is less than a threshold proportion of the digital image 302, the object is labeled as "Object Small." For instance, if the size of the bounding box 322 is less than n % of the size of the digital image 302, the classified object 320 is labeled as "Object Small." Any suitable value for n can be selected, such as n≤10.

Further to the system 400, the position classifier module 122 determines that the classified object 320 corresponds to the object identified by the reference data 402 and that the classified object 320 is outside of a threshold distance from the perimeter of the digital image 302 and is larger than a threshold proportion of the digital image 302. Accordingly, the position classifier module 122 classifies the position of the classified object 320 as object present 408.

Figure 5:
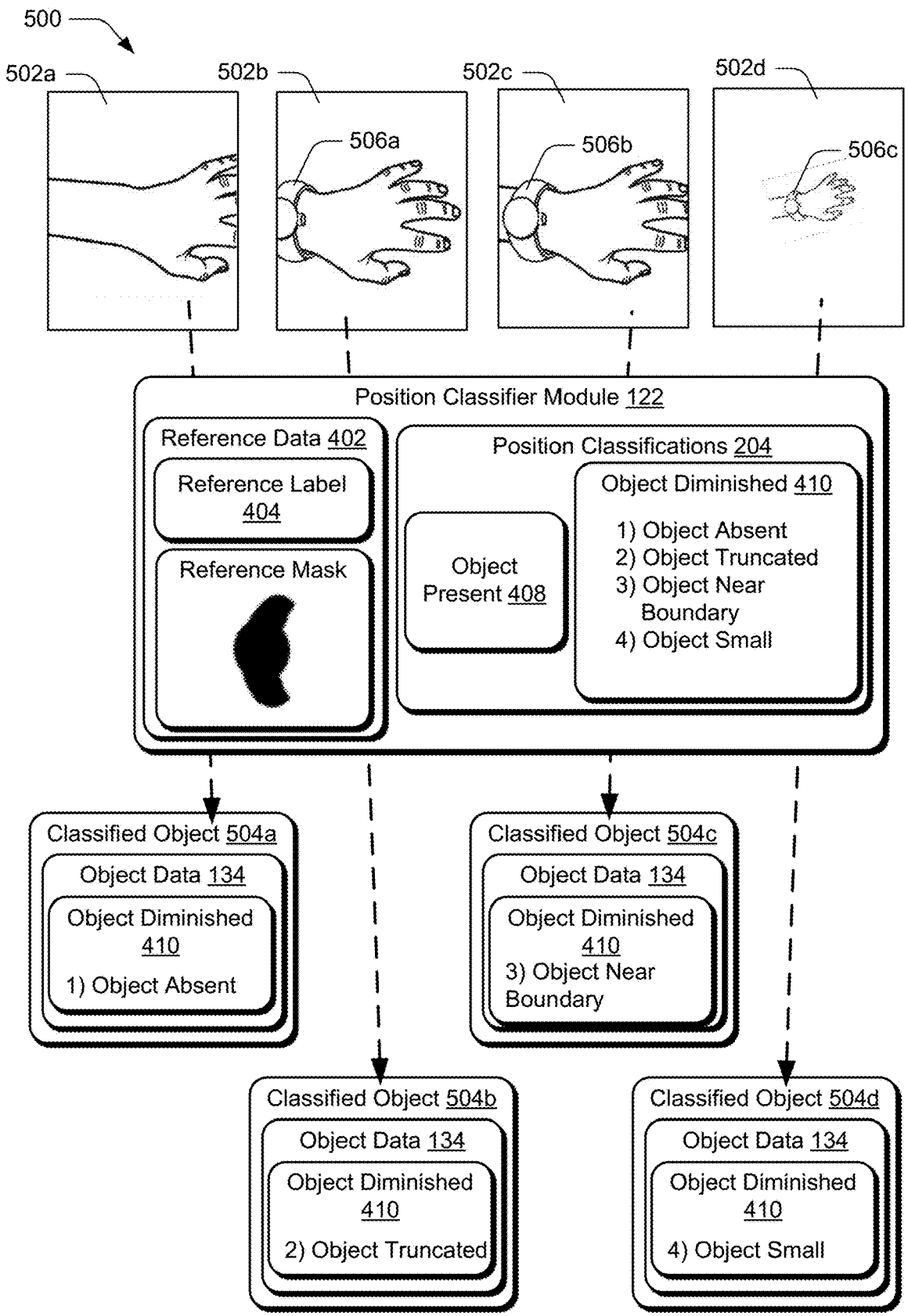
FIG. 5 depicts a system illustrating further example operation of the position classifier module.

FIG. 5 depicts a system 500 illustrating further example operation of the position classifier module 122. In the system 500, the position classifier module 122 takes other digital images as input and classifies objects in the digital images based on their respective positions. The system 500, for instance, includes digital images 502a, 502b, 502c, and 502d. Generally, these digital images represent instances of the digital images 116, introduced above. Further, the digital images 502a-502d have been processed by the object detector module 120 to obtain object data 134 for each digital image.

The position classifier module 122 processes the digital image 502a and determines that an object identified by the reference data 402 is not present in the digital image 502a. For instance, no image features extracted from the digital image 502a match an object identified by the reference data 402, e.g., the reference label 404. Accordingly, the position classifier module 122 labels the image 502a with a classified object 504a and labels the digital image 502a as object diminished 410, and specifically 1) object absent.

The position classifier module 122 processes the digital image 502b and determines that an object 506a is present in the digital image 502b, but that the object 506a is truncated. The object 506a, for instance, represents an object identified by the reference data 402, but the object 506a is partially truncated (e.g., a portion of the object 506a is partially cut off) by an edge of the digital image 502b. In at least one implementation, the position classifier module 122 makes this determination by comparing the reference mask 406 to a bitmap mask for the object 506a, and determines that a portion of the object's bitmap mask is truncated. Accordingly, the position classifier module 122 classifies the object 506a as a classified object 504b and labels the digital image 502b as object diminished 410, and specifically 2) object truncated.

The position classifier module 122 processes the digital image 502c and determines that an object 506b is present in the digital image 502c, but that the object 506b is near a boundary (e.g., outer perimeter) of the digital image 502c. For instance, the classifier module 318 identifies a position of a bounding box for the object 506b and determines that the bounding box is within a threshold distance of a perimeter of the digital image 502c. Accordingly, the position classifier module 122 classifies the object 506b as a classified object 504c and labels the digital image 502c as object diminished 410, and specifically 3) object near boundary.

The position classifier module 122 processes the digital image 502d and determines that an object 506c is present in the digital image 502d, but that the object 506c is smaller than a threshold proportion of the digital image 502d. For instance, the classifier module 318 identifies a size of a bounding box for the object 506c and compares the size of the bounding box to a total size of the digital image 502d. Based on this comparison, the position classifier module 122 determines that the bounding box is smaller than a threshold proportion (e.g., threshold size percentage) of the digital image 502d. Accordingly, the position classifier module 122 classifies the object 506c as a classified object 504d and labels the digital image 502d as object diminished 410, and specifically 4) object small.

Generally, these different image and position classifications can be utilized to sort the digital images into different groups, and can be stored along with the digital images to enable other processes to utilize the data for various purposes. The position classifications discussed in the systems 400, 500 are presented for purpose of example only, and it is to be appreciated that a variety of other position classifications may be implemented in accordance with the various techniques described herein.

Figure 6:
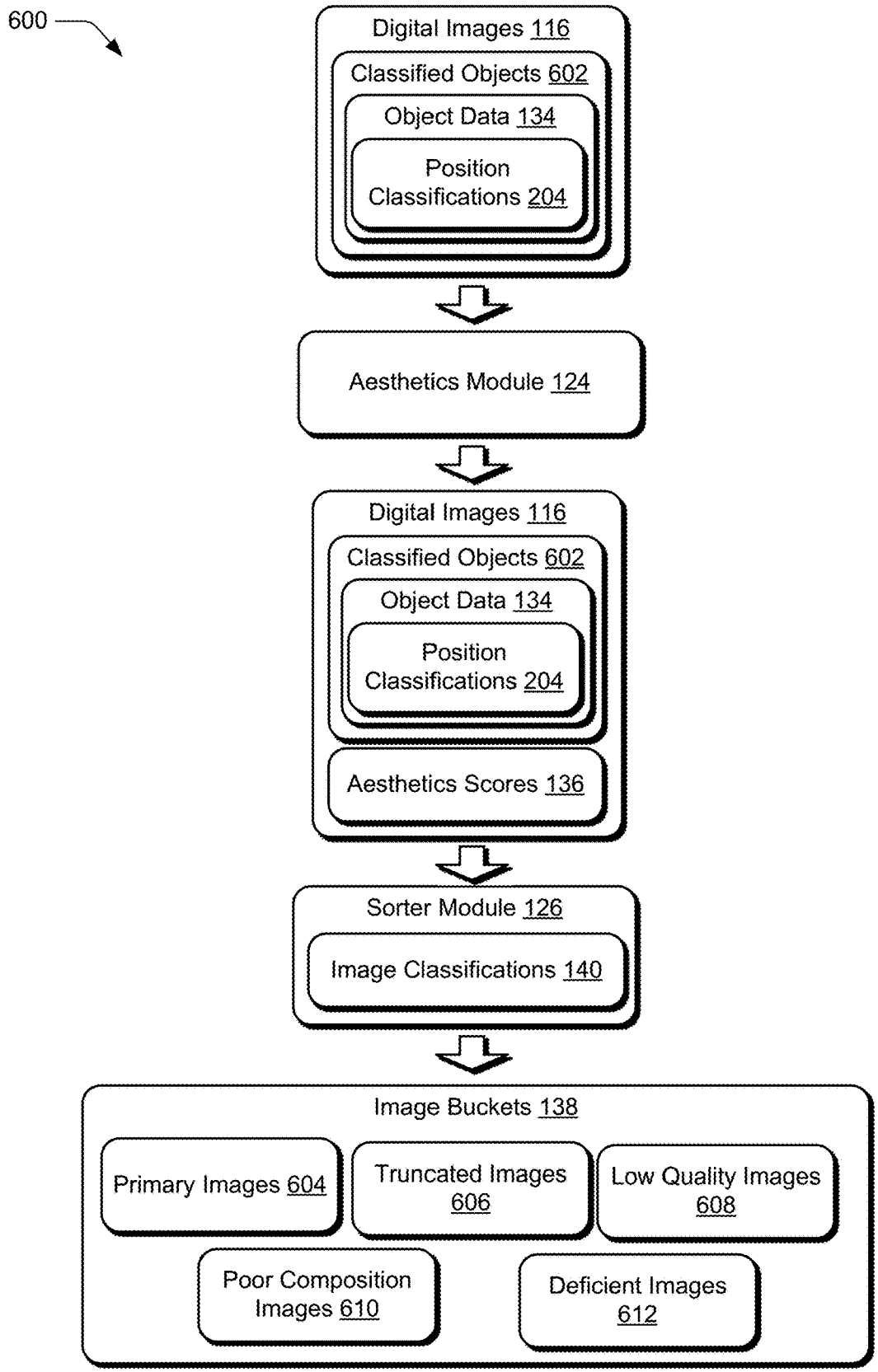
FIG. 6 depicts a system for determining aesthetics scores for digital images and sorting digital images into different image buckets.

FIG. 6 depicts a system 600 for determining aesthetics scores for digital images and sorting digital images into different image buckets. In the system 600, the digital images 116 with classified objects 602 are input to the aesthetics module 124, and the aesthetics module 124 generates aesthetics scores 136 that include an aesthetics score for each of the digital images 116. In at least one implementation, the aesthetics module 124 represents a machine learning model that is trained to characterize different aesthetics attributes of digital images. One example of the aesthetics module 124 is implemented by the Adobe Sensei® artificial intelligence system by Adobe, Inc. which exposes functionality for quantifying aesthetic attributes of digital images. Example aesthetics attributes that can be determined and used by the aesthetics module 124 to generate aesthetics scores 136 include image quality (e.g., sharpness, noise, contrast, color accuracy, distortion, and so forth), visual element balancing, color harmony, depth of field, lighting contrast, motion blur, object repetition, rule of thirds, image symmetry, relative vividness of color, and so on. Accordingly, based on these different visual attributes, the aesthetics module 124 can assign aesthetics scores that characterize how closely visual attributes of a digital image correspond to an aesthetics model generated based on known visual attributes. In at least one implementation, the aesthetics scores 136 are generated using a floating point scale of 0→1, with 0 representing a digital image with poor aesthetics attributes and 1 representing a digital image with very good aesthetics attributes.

Based on the position classifications 204 for the classified objects 602 of the digital images 116 and the aesthetics scores 136, the sorter module 126 uses the image classifications 140 to sort the digital images 116 into different image buckets 138. The image classifications 140, for instance, specify different image types based on their respective object positions and aesthetics scores. For example, the image classifications 140 are used to generate different image buckets 138 including primary images 604, truncated images 606, low quality images 608, poor composition images 610, and deficient images 612.

The primary images 604 represent digital images 116 with respective objects with a position classification 204 of object present 408 and with aesthetics scores 136 above a threshold aesthetics score. For instance, an aesthetics score threshold sa can be specified for the primary images 604. The truncated images 606 represent digital images 116 with truncated objects, such as described above. The low quality images 608 represent digital images 116 with aesthetics scores below the aesthetics score threshold. For instance, even though a digital image has an object classified as object present 408, if the digital image has an aesthetics score below the aesthetics score threshold it will be placed in the low quality images 608 bucket.

The poor composition images 610 represent images with objects that are determined to be improperly placed and/or sized within the digital images, such as objects classified as object diminished 410: 3) object near boundary and/or 4) object small. The deficient images 612 generally represent digital images that are likely to be discarded, such as with objects classified as object diminished 410: 1) object absent. Accordingly, the sorter module 126 sorts the digital images 116 into these different image buckets 138 based on their different visual attributes, e.g., their object position classifications 204 and their aesthetics scores 136.

Figure 7:
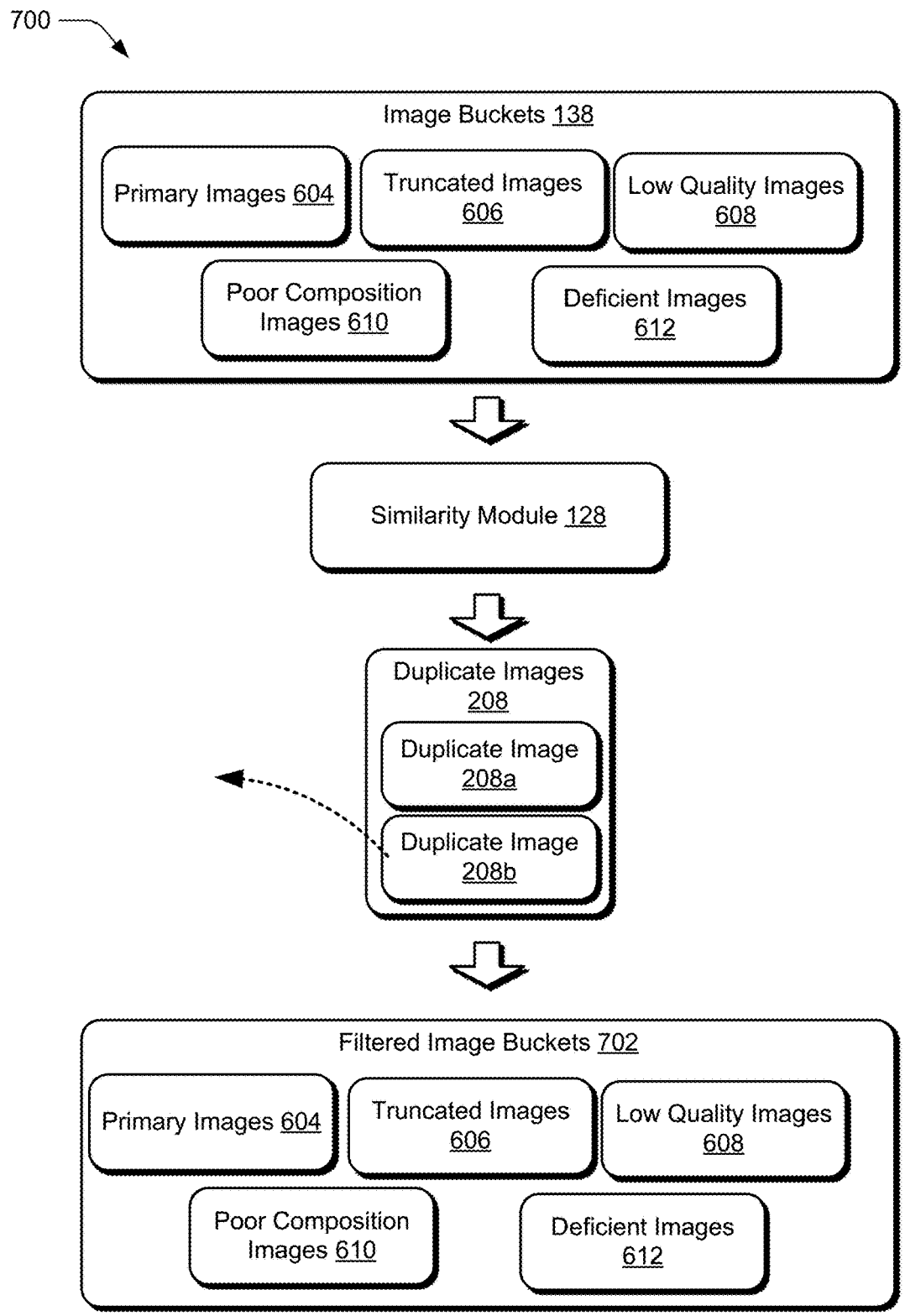
FIG. 7 depicts a system for removing duplicate digital images.

FIG. 7 depicts a system 700 for removing duplicate digital images. In the system 700, the similarity module 128 takes the image buckets 138 as input, and processes each image bucket 138 to identify duplicate images 208. Generally, the duplicate images 208 represent two or more digital images from a particular image bucket 138 that are identified as being visually similar. In at least one implementation, the similarity module 128 includes a feature detector (e.g., an Oriented FAST and rotated BRIEF (ORB) feature detector) that detects features in each digital image of each image bucket 138, and compares image features to identify digital images in each image bucket 138 that have similar features. In this particular example, the similarity module 128 identifies a group of duplicate digital images 208 from the primary images 604, including a duplicate image 208a and a duplicate image 208b. The duplicate images 208, for instance, represent similar digital images identified from within the primary images 604 bucket.

Further to the system 700, and based on identifying the duplicate images 208, the similarity module 128 selects one of the duplicate images 208 for removal from the primary images 604. Generally, different criteria can be considered for selecting a similar image for removal. For instance, the similarity module 128 compares aesthetic scores of the similar image 208a and the similar image 208b, and selects the image with the lowest aesthetics score for removal. In this particular example, the similarity module 128 selects the similar image 208b for removal. The similar image 208a, for instance, has a higher aesthetics score than the similar image 208b, and thus the similar image 208a is retained in the primary images 604 and the similar image 208b is omitted (e.g., removed) from the primary images 604. Accordingly, the similarity module 128 processes the image buckets 138 to identify and remove similar images and to generate filtered image buckets 702, which represent the image buckets 138 with similar images removed.

Figure 8:
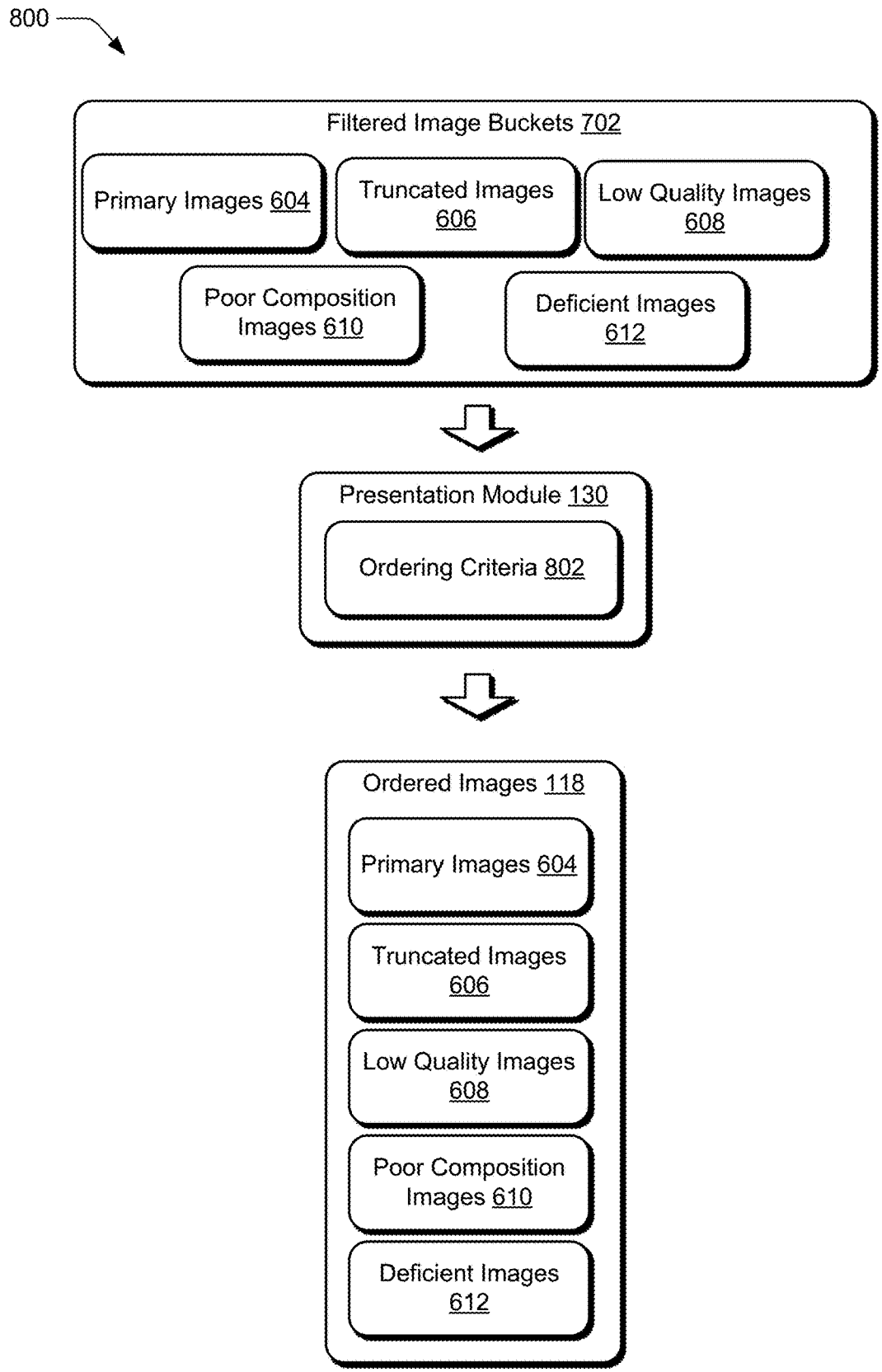
FIG. 8 depicts a system for ordering digital images for presentation.

FIG. 8 depicts a system 800 for ordering digital images for presentation. In the system 800, the presentation module 130 processes the digital images from the filtered image buckets 702 to generate the ordered images 118. To process the digital images, the presentation module 130 utilizes ordering criteria 802, which represent processing rules to be applied to the digital images of the filtered image buckets 702 to generate the ordered images 118. The ordering criteria 802, for instance, specify how the individual image buckets from the filtered image buckets 702 are to be ordered relative to each other, and how digital images 116 within each image bucket are to be ordered. In this particular example, the ordering criteria 802 specify a particular bucket ordering of the primary images 604 first, followed in order by the truncated images 606, the low quality images 608, the poor composition images 610, and finally, the deficient images 612.

Further, the digital images in each image bucket may be ordered starting with a digital image with the highest aesthetics score and then ordering the remaining digital images in descending order of decreasing aesthetics scores. Alternatively or additionally to ordering digital images within each image bucket based on aesthetics scores, the digital images may be ordered in each image bucket in chronological order starting with most recently captured and/or uploaded digital images and proceeding in descending chronological order.

An ordering score for each digital image may also be generated based on a weighted combination of aesthetics score and upload date, e.g., a date on which the digital image was uploaded to the image sharing service 104 and/or the image analysis system 102. For instance, an amount of weight given to an upload date for purposes of calculating an ordering score for a digital image may depend on recency of the upload date. A more recent upload date, for example, may have a higher weighting and thus a greater contribution to an ordering score than an older upload date. As one example, consider that a first digital image and a second digital image from the primary images 604 have the same aesthetics score. The first digital image, however, was uploaded more recently than the second digital image. Thus, in at least one implementation, the upload date criterion for the first digital image has a higher weighting than for the second digital image, and thus the first digital image has a higher ordering score than the second digital image. The first digital image may accordingly be ordered before the second digital image in the primary images 604. Thus, digital images within each image bucket may be ordered based on their respective ordering scores, with digital images with the highest ordering scores being ordered first and then in descending order of ordering score.

Figure 9:
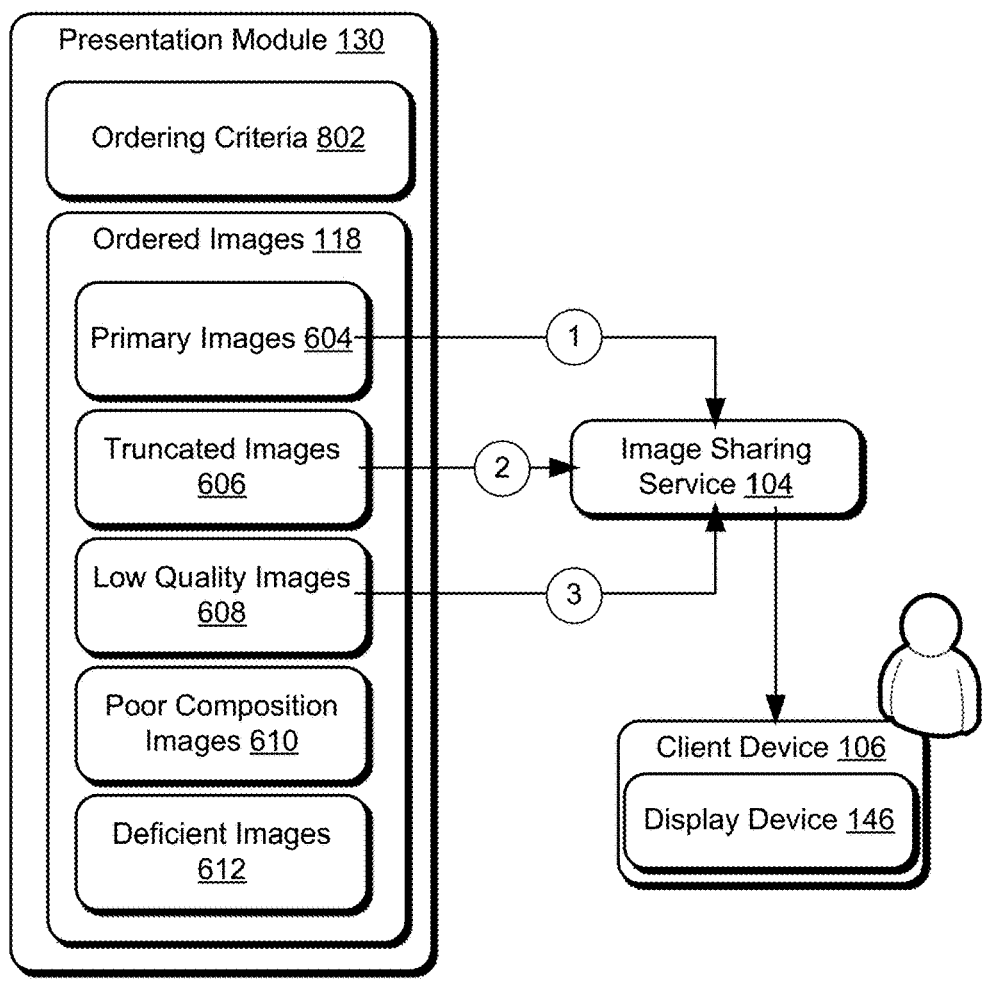
FIG. 9 depicts a system for providing ordered digital images.

FIG. 9 depicts a system 900 for providing ordered digital images. In the system 900, the presentation module 130 causes the ordered images 118 to be provided to the image sharing service 104 and/or the client device 106, such as for display by the display device 146. The ordered images 118, for instance, are ordered by the image analysis system 102 on behalf of the image sharing service 104 and/or the client device 106, and thus can be provided to the image sharing service 104 and/or the client device 106 on demand. For example, the ordered images 118 are generated in response to a user interaction via the client device 106 with the image sharing service 104 to obtain a set of digital images pertaining to a particular topic. Further, the ordered images 118 can be provided based on their order, e.g., primary images 604 first, followed by the proceeding image buckets.

In at least one implementation, digital images 116 from the ordered images 118 are provided in stages and based on multiple requests for digital images. For instance, consider that a user interacts with the client device 106 to access the image sharing service 104 to obtain information about a particular topic. Accordingly, based on an initial user interaction, the image sharing service 104 provides the primary images 604 to the client device 106, and the primary images 604 are provided ordered based on their internal order in the primary images 604. After the primary images 604 are provided, the user requests additional images, such as via a further user input to request digital images about the particular topic. Accordingly, the image sharing service 104 then provides the truncated images 606 an in order based on their internal ordering. If the user then requests additional images, images from the other image buckets may then be provided based on their order in the ordered images 118. In at least one implementation, the deficient images 612 and/or the poor composition images 610 are not made available for user access, e.g., these digital images are marked as unavailable for user access via the image sharing service 104, and/or are discarded.

Figure 10:
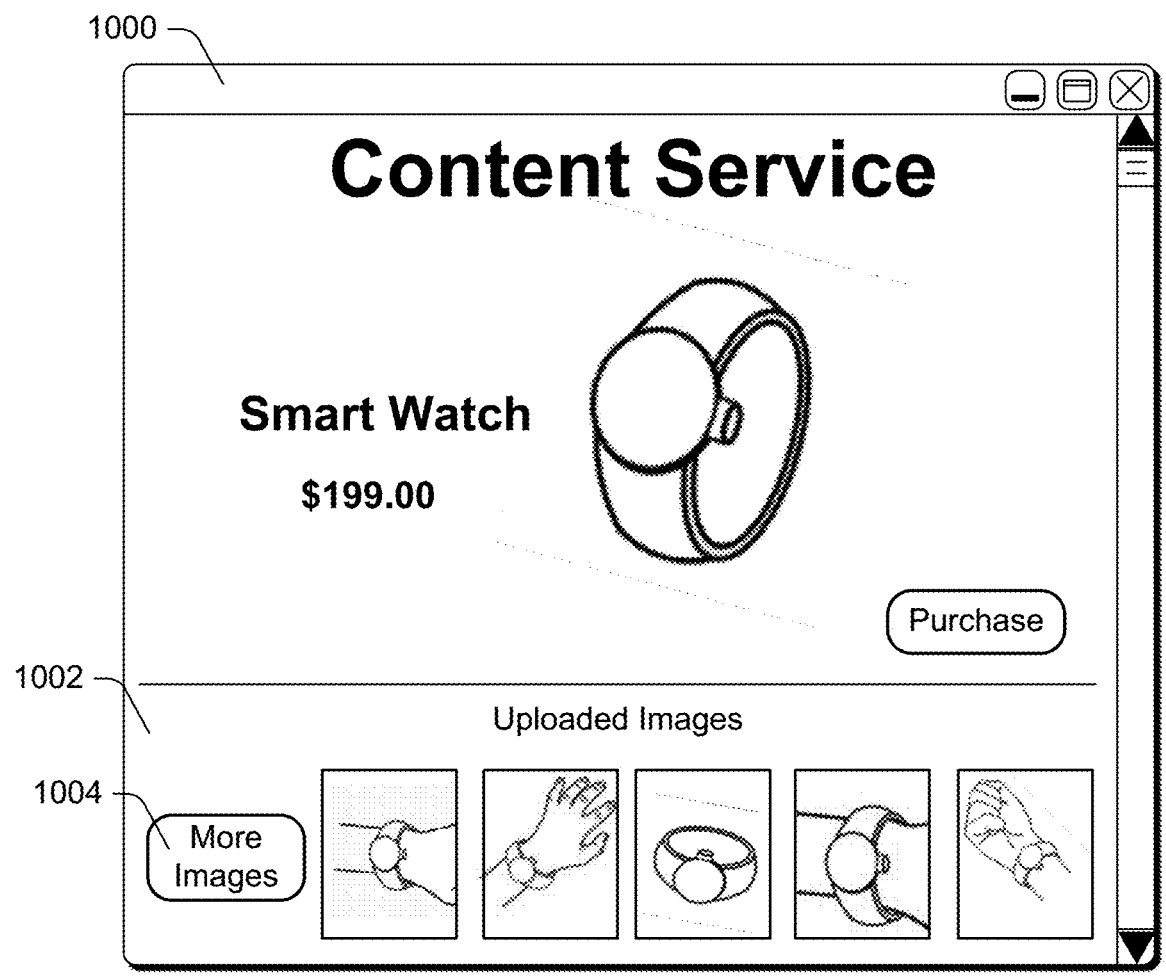
FIG. 10 depicts an example graphical user interface (GUI) that can be utilized to present digital images.

FIG. 10 depicts an example graphical user interface (GUI) 1000 that can be utilized to present digital images. The image sharing service 104 and/or the client device 106, for instance, can generate the GUI 1000 for presenting digital images, such as the ordered images 118. In this particular example, the GUI 1000 includes information about a product for sale, i.e., a smartwatch. A user, for instance, can interact with the GUI 1000 to purchase a smartwatch. The GUI 1000 further includes an images region 1002, which displays different digital images related to the topic of smartwatches. The images region 1002, for instance, is used to display smartwatch-related digital images that are uploaded by end users to the image sharing service 104.

In at least one implementation, when a user initially navigates to the GUI 1000 (e.g., via a web browser and/or other web-enabled functionality), the images region 1002 is automatically populated with digital images from the primary images 604. Further, digital images from the primary images 604 can be retrieved and presented based on their respective aesthetics scores, such as starting with a digital image with a highest aesthetics score and then presenting subsequent digital images in order of descending aesthetics score.

The GUI 1000 further includes an images control 1004 that is selectable to cause additional digital images to be retrieved and presented in the images region 1002, e.g., to supplement or replace the digital images currently displayed. For instance, in response to user selection of the images control 1004, the presentation module 130 selects additional digital images from the ordered images 118 for display in the images region 1002. In at least one implementation, if no additional images from the primary images 604 are available (e.g., all of the primary images 604 have already been displayed), digital images from other image buckets can be retrieved and output for display, such as based on their ordering in the ordered images 118.

Having discussed example details of the techniques for digital image ordering based on object position and aesthetics, consider now some example procedures to illustrate additional aspects of the techniques.

Example Procedures

This section describes example procedures for digital image ordering based on object position and aesthetics in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the image analysis system 102 of FIG. 1 that makes use of the image manager module 110 and using aspects described in the scenarios above.

Figure 11:
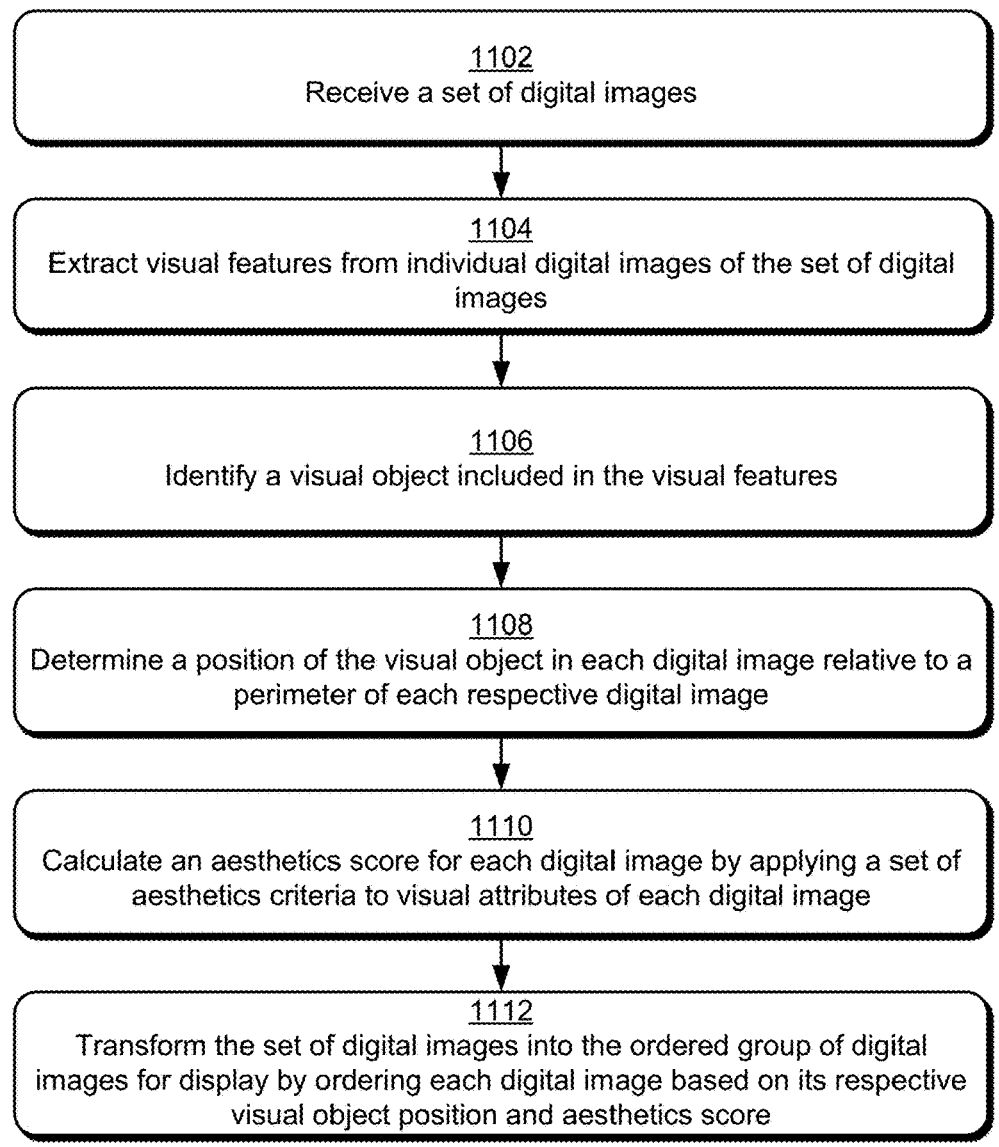
FIG. 11 depicts an example procedure for transforming a set of digital images into an ordered group of digital images.

FIG. 11 depicts an example procedure 1100 for transforming a set of digital images into an ordered group of digital images. Step 1102 receives a set of digital images. The image analysis system 102, for instance, receives a set of digital images 116, such as from the image sharing service 104. In at least one implementation, the digital images as received are ordered chronologically, e.g., based on an order in which they were uploaded to the image sharing service 104.

Step 1104 extracts visual features from individual digital images of the set of digital images. For example, the object detector module 120 processes each digital image to extract structural features. As described previously, for instance, the feature extraction model 306 is leveraged to analyze the digital images and to extract visual features that likely correspond to visual objects within the digital images.

Step 1106 identifies a visual object included in the visual features. For example, the object detector module 120 process the visual features extracted from each digital images, and compares the extracted visual features to visual features of known visual objects. As described previously, the object detector module 120 can generate a bitmap mask for extracted structural features, and compare the bitmap mask to reference masks for known visual objects to identify a matching known visual object. In at least one implementation, the object detector module 120 outputs an object metrics data array for each digital image including:

| | |
|---|---|
| VRect boundingBox; | //Rect in the digital image describing a location of a visual object relative to digital image as a whole, e.g., the perimeter of the digital image. |
| String label; | //Tag/label for the visual object |
| float confidenceScore | //normalized confidence score for each object found in the digital image |
| Bitmap mask; | //Mask region for visual object(s) found in digital image |

In at least one implementation, if multiple candidate visual objects are identified in a digital image, the visual object with the highest confidence score can be selected as a visual object for the digital image.

Step 1108 determining a position of the visual object in each digital image relative to a perimeter of each respective digital image. The position classifier module 122, for example, compares a position of a visual object to a digital image as a whole, such as by determining a distance between the visual object and a perimeter boundary of the digital image. In at least one implementation, the position is determined based on a distance between a bounding box of a visual object and a perimeter of a respective digital image. Alternatively or additionally, the position is determined by comparing a bitmap mask of the object to a reference mask. Generally, the position of a visual object may be characterized in different ways, such as using pixel coordinates (e.g., x/y coordinates) that describe the object position relative to a point in a digital image, e.g., the upper left corner.

Based on the determined object position, the position classifier module 122 can classify a visual object in a digital image into different position categories. For instance, visual objects that are within a threshold distance of a center of a digital image, and/or that are further than a threshold distance of a perimeter of a digital image, can be classified as "centered." Generally, digital images with centered visual objects are preferred, and may be utilized for generating the primary images 604, previously described. Other types of position classifications include "object absent," "object truncated," "object near boundary," "object small," and so forth.

Step 1110 calculates an aesthetics score for each digital image by applying a set of aesthetics criteria to visual attributes of each digital image. Different ways for calculating aesthetics scores are detailed above.

Step 1112 transforms the set of digital images into the ordered group of digital images for display by ordering each digital image based on its respective visual object position and aesthetics score. For instance, the sorter module 126 sorts the digital images into different image buckets 138 based on their respective object positions and aesthetics scores. In at least one implementation, this can involve rearranging the digital images from a chronological order. The similarity module 128 may then identify and remove duplicate images, and the presentation module 130 can cause the ordered images to be output for display.

As indicated above, digital images with visual objects that are classified as "centered" and with aesthetics scores above a threshold score may be grouped into the primary images 604, and may be ordered in the primary images 604 based on their respective aesthetics scores. Other examples of different object groups are detailed above.

In at least one implementation, an image score $s_i$ can be generated for each digital image based on a visual object position and aesthetics score for the digital image. For instance, each object position classification may be associated with a position score $s_p$ that is determined based on how close an object is to a center of a digital image, whether an object is truncated, a size of a visual object, and so forth. A visual object that is classified as centered, that is not truncated, and that is larger than a threshold object size can be assigned a $s_p$ of 1. Other classified object positions may be assigned other $s_p$, which will typically be less than 1. For instance, a visual object that is classified as centered, that is not truncated, but that is smaller than a threshold object size can be assigned as $s_p$ of 0.5.

Accordingly, in at least one implementation, an image score for a digital image can be generated by combining (e.g., summing) its position score and its aesthetics score. Digital images with image scores in similar value ranges can be then be grouped together, such as described with reference to the image buckets 138 detailed previously. Further, digital images within each image bucket can be ordered based on their respective image scores.

Figure 12:
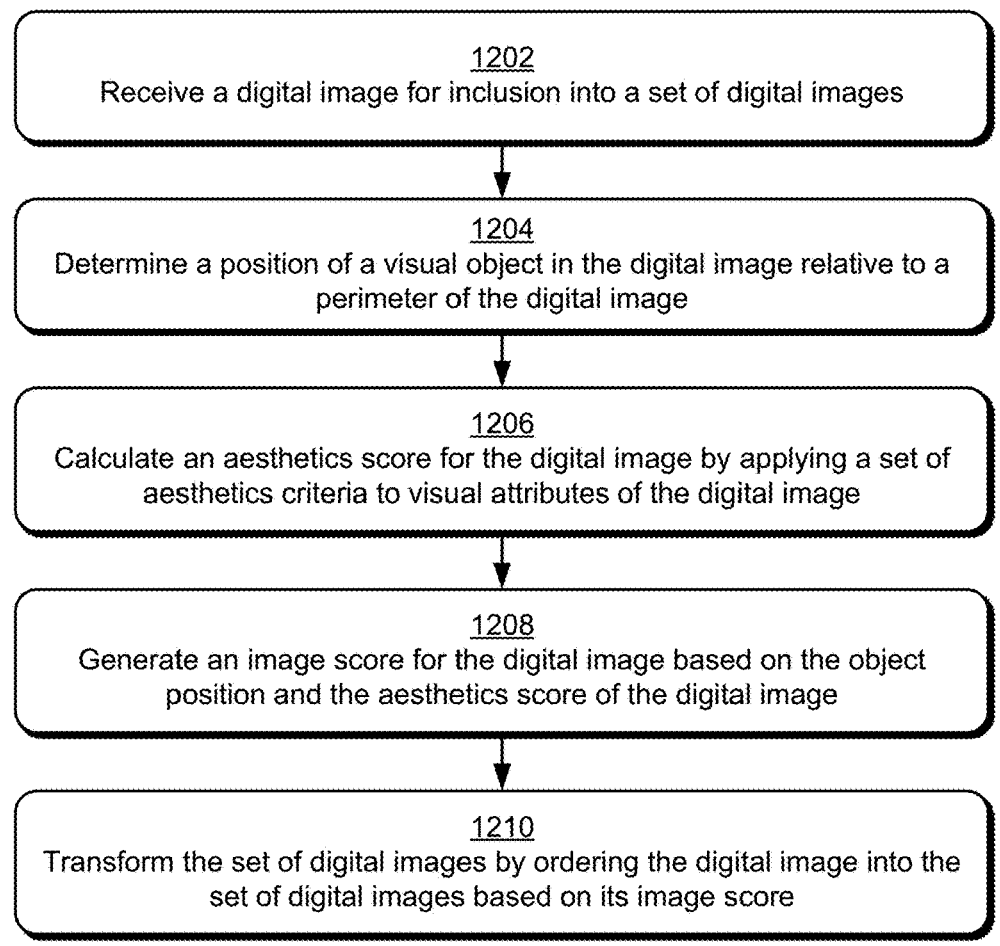
FIG. 12 depicts an example procedure for ordering a digital image into a group of digital images.

FIG. 12 depicts an example procedure 1200 for ordering a digital image into a group of digital images. The procedure, for instance, can be performed after an ordered group of digital images is generated, such as described above. Step 1202 receives a digital image for inclusion into a set of digital images. The image analysis system 102, for example, detects that a digital image is to be added to an existing set of digital images. In at least one implementation, the existing set of digital images represents a group of digital images that has previously been ordered, such as the ordered images 118. A user, for instance, uploads a new digital image to the image sharing service 104, and the image sharing service 104 leverages the image analysis system 102 to place the new digital image into an existing group of digital images.

Step 1204 determines a position of a visual object in the digital image relative to a perimeter of the digital image. Generally, the various techniques described above for determining and classifying a position of a visual object can be leveraged.

Step 1206 calculates an aesthetics score for the digital image by applying a set of aesthetics criteria to visual attributes of the digital image. Generally, the various techniques described above for determining an aesthetics score for a digital image can be leveraged.

Step 1208 generates an image score for the digital image based on the object position and the aesthetics score of the digital image. As explained above, an image score for a digital image can be calculated based on a combination of an object position classification and an aesthetics score.

Step 1210 transforms the set of digital images by ordering the digital image into the set of digital images based on its image score. The sorter module 126, for instance, compares the image score of the digital image to image scores of existing digital images of the set of digital images, and orders the digital image into the set of digital images based on an ordering position indicated by the comparison. Consider, for instance, that image scores for the set of digital images were previously calculated and used to order individual digital images of the set of digital images. Thus, each digital image has an associated image score. When the image score for the new digital image is calculated, the new digital image is placed in an ordered position in the set of digital images based on its image score, e.g., above digital images with lower image scores, and below digital images with higher image scores.

In at least one implementation, prior to including the new digital image into the set of digital images, the similarity module 128 processes the set of digital images to determine if any of the digital images are duplicates of the new digital image. If an existing duplicate image is identified, the similarity module 128 can discard the digital image with the lowest aesthetics score, e.g., either the new digital image or a duplicate digital image from the existing set of digital images.

Thus, techniques described herein enable digital images to be dynamically analyzed and ordered based on various criteria, such as object position, aesthetics, creation (e.g., upload) date, and so forth.

Having described example procedures in accordance with one or more implementations, consider now an example system and device that can be utilized to implement the various techniques described herein.

Example System and Device

Figure 13:
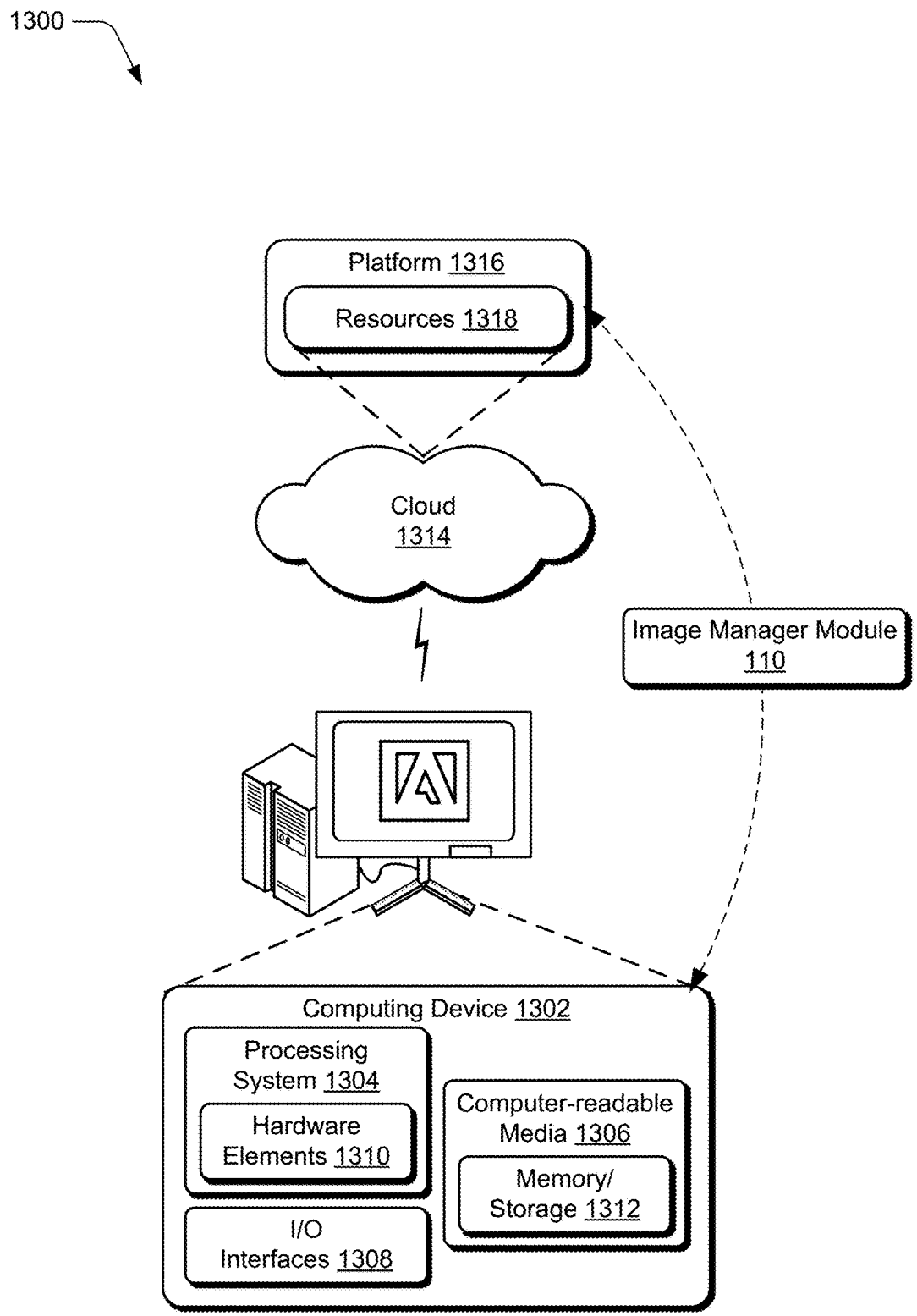
FIG. 13 illustrates an example system including various components of an example device that can be implemented as any type of computing device as described and/or utilized with reference to FIGS. 1-12 to implement aspects of the techniques described herein.

FIG. 13 illustrates an example system generally at 1300 that includes an example computing device 1302 that is representative of one or more computing systems and/or devices that may implement the various techniques described herein. This is illustrated through inclusion of the image manager module 110. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to transform a set of digital images into an ordered group of digital images, a method implemented by at least one computing device, the method comprising:

extracting, by the at least one computing device, visual features from individual digital images of the set of digital images;

identifying, by the at least one computing device, a visual object included in the visual features based on a bitmap mask and a confidence score that indicates a likelihood that the visual object represents an instance of an object identified by an object tag;

determining, by the at least one computing device, a position of the visual object in each digital image of the set of digital images, wherein the position is determined relative to a perimeter of each respective digital image using coordinates of pixels of the visual object and the bitmap mask;

calculating, by the at least one computing device, an aesthetics score for each digital image by applying a set of aesthetics criteria to visual attributes of each digital image; and transforming, by the at least one computing device, the set of digital images into the ordered group of digital images for display by arranging each digital image in a particular order based on its respective visual object position and aesthetics score.

2. A method as described in claim 1, wherein said extracting and said identifying utilize a machine learning model that takes the visual features as input and compares the visual features to known visual features for known visual objects to identify the visual object.

3. A method as described in claim 1, wherein said identifying the visual object comprises comparing the bitmap mask to a known mask for a known object type to determine that the visual object represents the known object type.

4. A method as described in claim 1, wherein said determining the position of the object in each digital image comprises comparing the bitmap mask to a known mask for a known object type to determine whether the visual object is truncated in one or more of the digital images.

5. A method as described in claim 1, further comprising generating, by the at least one computing device, a bounding box for the visual object, and wherein said determining the position of the object in each digital image comprises comparing a position of the bounding box in each digital image to a perimeter of each digital image.

6. A method as described in claim 1, further comprising generating, by the at least one computing device, a bounding box for the visual object, and wherein said determining the position of the object in each digital image comprises comparing a size of the bounding box in each digital image to a size of the perimeter of each respective digital image.

7. A method as described in claim 1, wherein said determining a position of the object in each digital image of the set of digital images comprises determining, by the at least one computing device, that a position of the visual object is within a threshold distance of a perimeter of a particular digital image, and wherein the method further comprises sorting, by the at least one computing device, the particular digital image into a different group of digital images based on the position of the visual object in the particular digital image.

8. A method as described in claim 1, wherein said determining position of the object in each digital image of the set of digital images comprises determining, by the at least one computing device, that a visual size of the visual object is smaller than a threshold size for a particular digital image, and wherein the method further comprises sorting, by the at least one computing device, the particular digital image into a different group of digital images based on the size of the visual object in the particular digital image.

9. A method as described in claim 1, wherein said determining a position of the object in each digital image of the set of digital images comprises determining, by the at least one computing device, that the visual object is truncated in a particular digital image, and wherein the method further comprises sorting, by the at least one computing device, the particular digital image into a different group of digital images based on the visual object being truncated in the particular digital image.

10. A method as described in claim 1, further comprising:
identifying, by the at least one computing device, two or more similar digital images in the set of digital images; and omitting, by the at least one computing device, at least one of the two or more similar digital images from the ordered group of digital images.

11. A method as described in claim 10, wherein a digital image of the two or more similar digital images with a lowest aesthetics score is omitted from the ordered group of digital images.

12. In a digital medium environment to order a digital image into a set of digital images, a method implemented by at least one computing device, the method comprising:
receiving, by the at least one computing device, the digital image for inclusion into the set of digital images;
identifying, by the at least one computing device, a visual object in the digital image based on a bitmap mask and a confidence score that indicates a likelihood that the visual object represents an instance of an object identified by an object tag;
determining, by the at least one computing device, a position of the visual object in the digital image relative to a perimeter of the digital image using coordinates of pixels of the visual object and the bitmap mask;
calculating, by the at least one computing device, an aesthetics score for the digital image by applying a set of aesthetics criteria to visual attributes of the digital image;
generating, by the at least one computing device, an image score for the digital image based on the position of the visual object and the aesthetics score of the digital image; and
transforming, by the at least one computing device, the set of digital images by comparing the image score of the digital image to image scores of existing digital images of the set of digital images, and ordering the digital image into the set of digital images by arranging the digital image in a particular order based on an ordering position indicated by said comparing.

13. A method as described in claim 12, wherein said receiving the digital image occurs based on a user upload of a new digital image to an image sharing service that exposes the set of digital images for user access.

14. A method as described in claim 12, wherein said determining the position of the visual object in the digital image comprises at least one of:
determining, by the at least one computing device, a size of the visual object relative to a size of the perimeter of the digital image; or
determining, by the at least one computing device, a distance between a bounding box of the visual object and the perimeter of the digital image.

15. A method as described in claim 12, further comprising:
identifying, by the at least one computing device, a different digital image of the set of digital images that is visually similar to the digital image; and
removing, by the at least one computing device, the different digital image from the set of digital images.

16. A method as described in claim 12, further comprising causing, by the at least one computing device, the transformed set of digital images to be presented for display based on the particular order.

17. A non-transitory computer-readable storage medium storing executable instructions, which when executed by a processing device, cause the processing device to perform operations comprising:
receiving digital images ordered in a chronological order;
identifying a visual object included in visual features extracted from the digital images based on a bitmap mask and a confidence score that indicates a likelihood that the visual object represents an instance of an object identified by an object tag;

determining visual object positions of the visual object relative to perimeters of the digital images using coordinates of pixels of the visual object and the bitmap mask; and transforming the digital images into an ordered group of digital images for display by arranging the digital images in a particular order based on the visual object positions, the particular order is different from the chronological order.

18. A non-transitory computer-readable storage medium as described in claim 17, wherein the chronological order is based on an order in which the digital images were uploaded to an image sharing service.

19. A non-transitory computer-readable storage medium as described in claim 17, wherein the digital images are arranged in the particular order based on aesthetics scores calculated by applying a set of aesthetics criteria to visual attributes of the digital images.

20. A non-transitory computer-readable storage medium as described in claim 17, wherein a digital image of the digital images is labeled as object diminished based on a visual object position relative to a perimeter of the digital image.

* * * * *